Oct. 20, 1931.　　　G. E. ROWE　　　1,828,232
CLEAT CONVEYER
Filed Dec. 19, 1927　　　3 Sheets-Sheet 1

Inventor:
George E. Rowe
by Robson D Brown
atty

Oct. 20, 1931.        G. E. ROWE        1,828,232
CLEAT CONVEYER
Filed Dec. 19, 1927        3 Sheets-Sheet 2

Inventor:
George E. Rowe.
by Robert D Brown
atty.

Oct. 20, 1931.　　　　G. E. ROWE　　　　1,828,232
CLEAT CONVEYER
Filed Dec. 19, 1927　　　3 Sheets-Sheet 3

Inventor:
George E. Rowe.
by Robert D. Brown
Atty

Patented Oct. 20, 1931

1,828,232

UNITED STATES PATENT OFFICE

GEORGE E. ROWE, OF WEST HARTFORD, CONNECTICUT, ASSIGNOR TO HARTFORD-EMPIRE COMPANY, OF HARTFORD, CONNECTICUT, A CORPORATION OF DELAWARE

CLEAT CONVEYER

Application filed December 19, 1927. Serial No. 240,992.

This invention relates to combined conveying and positioning or spotting devices, and more particularly to a conveyer or buck for use in connection with the making of glassware for transporting the ware from a receiving station, which may be adjacent to a blowing or molding machine, to a delivering station, which may be a predetermined spot adjacent to the receiving end of an annealing lehr into which the ware is to be placed by a suitable transfer device or stacker.

Bucks and spotting devices of this character must deliver the articles, such as bottles or the like, at a predetermined time and rate to a predetermined point in alignment with the tongs forming a part of the usual stacker. This also includes the problem of alignment of the ware with its greatest horizontal dimension longitudinal of the conveyer, as certain types of forming machines normally deliver the ware at an improper angle, that is, an acute angle with the buck, so that it is necessary partially to rotate the ware before delivering it to the final spotting mechanism. Also, a machine may be called upon to handle many different types and sizes of ware and must be adjustable in various ways in order to be adaptable to any type or size.

Among the objects of the invention, therefore, are to provide a combined buck and spotting device which will fulfill all these requirements; more especially to provide a buck having means for receiving articles at a variety of angles and positions and for automatically lining them up in a uniform manner; to provide a combined buck and spotter by which the articles may be delivered to a predetermined spot, for example in alignment with the tongs of a stacker; to provide a combined buck and spotter which is quickly and easily portable and which may be adjusted to cooperate with the tongs of various stackers or other conveying devices, both as to position in vertical and horizontal directions and as to rate and time of delivery; to provide a combined buck and spotting device which is adjustable to accommodate ware of various sizes and shapes and in which bottles, for example, may be positively aligned with the tongs of a stacker as to their necks or finishes substantially independent of their diameters or other dimensions; and to provide a device of the class described in which the danger of the ware toppling over is minimized.

Other objects and advantages of my invention will be apparent from a reading of the following specification and subjoined claims, when taken in conjunction with the accompanying drawings, in which:

Figure 1:
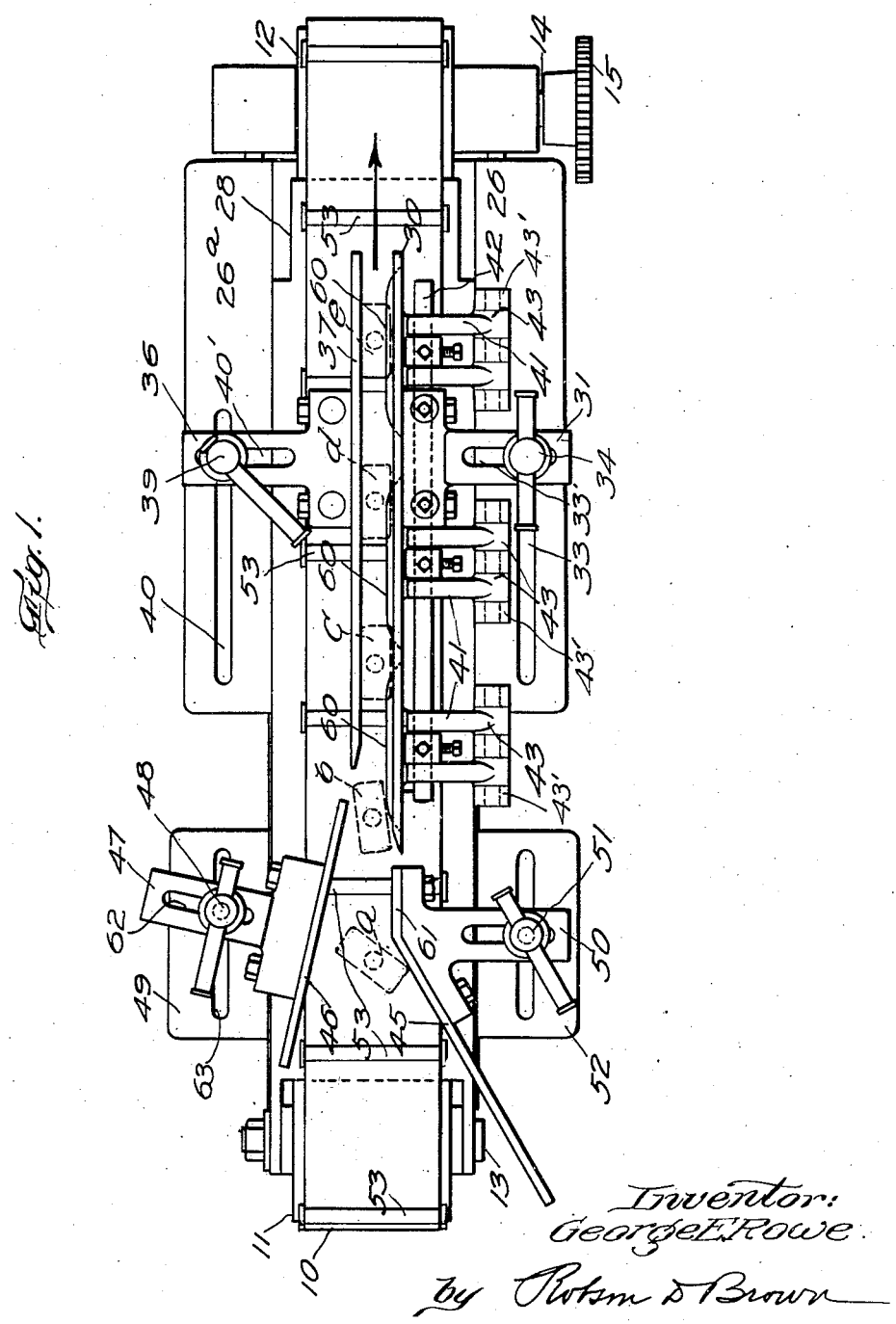
Figure 1 is a plan view of a combined buck and spotting device constructed in accordance with my invention.

In the accompanying drawings 10 represents an endless belt, preferably of foraminous metallic material extending around drums 11 and 12, the former being mounted upon a shaft 13 suitably journaled in bearings adjacent to one end of the device, and the latter fixed to a shaft 14 journaled in suitable bearings adjacent to the opposite end of the device. The shaft 14 carries a sprocket wheel 15 operatively connected by a chain 16 with a sprocket wheel 17 which is suitably secured to the intermittently operated shaft 18 of a driving mechanism 19 in a manner later to be described. This driving mechanism 19 may be of any well-known construction, but is preferably of the type shown in my copending application Serial No. 209,217, filed July 29, 1927. The shaft 18 is preferably operated to actuate the belt 10 uniformly step-by-step, each movement of the shaft 18 acting through the mechanism described to shift the conveyer a predetermined distance as will be explained later.

The frame of the driving mechanism 19 is provided with suitable means for effecting vertical adjustment of the conveyer belt 10, comprising a pair of vertical threaded posts 20 having mounted thereon internally threaded hand wheels 21 resting upon the top of an apertured carriage frame 22. The carriage frame 22 may be provided with trucks 23 on which the entire device can be readily moved about over a floor or other supporting surface to place it in any desired position. When so placed, threaded posts 24 mounted on the carriage 22, may be screwed downwardly against the supporting surface sufficiently to prevent movement of the machine on the trucks or wheels 23, these threaded posts being secured in adjusted position by means of check nuts 25. The posts 24 may serve also to adjust the level or inclination of the conveyer belt 10 as desired.

The conveyer supporting frame is fixed in position upon the frame of the driving mechanism 19 and includes a pair of vertically disposed side members 26 and 26a in the form of short channel irons between the upper ends of which is secured, by means of bolts 27 (Fig. 2) a table or bed 28 disposed in position to support the upper or ware-carrying strand of the conveyer belt 10.

Upon the top flange of the channel iron 26 is a post 29 supporting a longitudinally extending relatively long straight side guard rail 30 that is normally substantially parallel with the direction of movement of the conveyer belt 10. This rail 30 is suitably secured to a slotted shank member 31 resting upon the top of the post 29. A bolt 32 extends upwardly through a longitudinal slot 33 in the upper flange of the channel iron 26 through the post 29 and a transversely extending slot 33' formed in the shank 31, and is provided at its upper end with a suitable nut 34 by means of which the rail 30 may be secured in position with provision for adjustment longitudinally, transversely and angularly of the direction of travel of the conveyer belt 10.

Upon the top flange of the channel iron 26a is a similar post 35 on which is seated the shank member 36 similarly secured to the longitudinally extending side guide rail 37 similarly secured in position by means of a bolt 38 provided at its upper end with a nut 39, said bolt extending upwardly through a longitudinal slot 40 provided in the upper flange of the channel iron 26a, through the post 35 and a transversely extending slot 40' provided in the shank member 36. This construction provides for adjustment of the guide rail 37 longitudinally, transversely and angularly with respect to the conveyer belt 10. Thus it will be seen that guide rails 30 and 37 are both universally adjustable in the plane of the ware carrying strand of the conveyer belt 10 within the limits of the possible adjustments.

Immediately below the side guide 30 are a plurality of presser shoes 60, each integral with or secured to one arm of a bell crank lever 41 pivoted on a rod 42 which in turn is supported by the guard rail 30. The other arm of each bell crank 41 extends substantially horizontally outward from the pivot rod 42 and is provided at its outer end with a bar 43 supporting a plurality of interchangeable weights 43' of various sizes which yieldingly urge the pressure shoe arm of the bell crank inwardly with a predeterminable pressure, said inward movement when the shoes are not in engagement with an article on the conveyer belt 10, being limited by the engagement of an adjustable stop screw 44, carried by said arm, with the outer side of the guard rail 30.

The articles to be transported are placed upon the conveyer belt 10 at the left hand end thereof, for example, in the position a (Fig. 1), and as the ware carrying strand of the conveyer belt 10 moves toward the right, a primary guide member 45 and a secondary guide member 46 disposed at oblique angles to the conveyer belt 10, position said articles roughly, as shown by position b, so that they will pass between the guide plate 37 and the presser shoes 60, as said ware carrying strand of the belt 10 is moved forwardly step-by-step in the direction indicated by the arrow in Fig. 1. The primary guide member 45 is formed with an extended portion 61 opposite the secondary guide member 46 and cooperating therewith to prevent the articles from toppling over while they are being angularly aligned with the conveyer, the portion 61 being normally substantially parallel to the direction of movement of articles on the conveyer belt 10.

The obliquely disposed secondary guide member 46 has a slotted shank portion 47 fastened by means of a bolt and nut 48 extending through a slot 62 in the shank portion 47 and a slot 63 in the bracket 49, which projects from the frame of the machine. Thus the guide member 46 may be adjusted angularly, longitudinally and transversely with respect to the conveyer belt.

The opposite primary guide member 45 is likewise provided with a slotted shank portion 50 secured by means of a bolt and nut 51 to a slotted bracket 52 similarly secured to the frame of the machine, which provides for adjustment of the guide member 45 angularly, longitudinally and transversely with respect to the conveyer belt 10. Thus it will be seen that the entering guide members 45 and 46 are both universally adjustable in the plane of the ware carrying strand of the conveyer belt 10 within the limits of the possible adjustments.

The conveyer belt 10 is provided with a plurality of transversely disposed cleats 53 preferably formed of hollow metallic pipe sections having flattened ends and disposed equidistantly throughout the length of the conveyer belt 10. The driving mechanism 19 in itself forms no part of the present invention, but may be constructed as shown and described in my prior application filed July 29, 1927, Serial No. 209,127. This particular driving mechanism is actuated in synchronism with a stacker; that is, every time the stacker picks up a bottle, it permits the buck or transportation apparatus to move ahead one step to place a new bottle at delivery position, the steps in the present case being equal to, or an even multiple of, the distance between two contiguous cleats 53 on the conveyer belt 10.

When each article is placed in position *a* upon the left hand end of the conveyer belt (Fig. 1), it is carried along between and angularly aligned by the primary and secondary obliquely disposed guide members 45 and 46 (position *b*) to the entrance ends of the two side guide rails 30 and 37. As the article passes between the presser shoes 60 and rail 37, its motion is frictionally retarded (positions *c* and *d*) until it is engaged by the cleat 53 immediately behind it, whereupon it is forced or carried along between the presser shoes 60 and the relatively long side guide 37 to position *e*. Inasmuch as the weights 43' may be interchanged, the desired pressure may be placed on the ware properly to retard it as described without the danger of toppling it over, the pressure being variable to accommodate ware of various types and weights. When the article is engaged by the first presser shoe 60, it is deflected laterally thereby against the side guide 37, said first presser shoe 60 yielding outwardly against the opposition of the weights 43', the article being thus yieldingly urged against the side guide 37. As will be clear, the presser shoe fits or adjusts itself to the width of the bottle within certain limits, so that certain varied sizes of ware may be accommodated without adjustment of the guide rails 30 and 37, this variation usually being measured by the adjustment of screw 44 governing the distance which the presser shoe projects transversely beyond the guide rail 30 when no bottle is engaged by it.

When the apparatus is employed to deliver bottles or the like to the stacker of a lehr, said stacker is so disposed with relation to the delivery end of the apparatus that it will automatically remove each bottle from the conveyer while said bottle occupies a definite delivery position or spot, preferably position *e*, between the third or last presser shoe and the guide rail 37. In order that the conveyer 10 may be adjusted for ware of various sizes and shapes with respect to its driving mechanism 19, so that the part of the article to be gripped will be accurately positioned with respect to the stacker when it arrives at this delivery position, the sprocket wheel 17 is secured to its shaft 18 with provision for angular adjustment, whereby the cleats 53 occupy the desired position at the dwells. As herein shown, this provision consists in constructing the shaft 18 with a head 54 carrying bolts 55 extending through arcuate slots 56 provided in sprocket wheel 17, whereby the sprocket wheel is clamped to the head 54.

Figure 2:
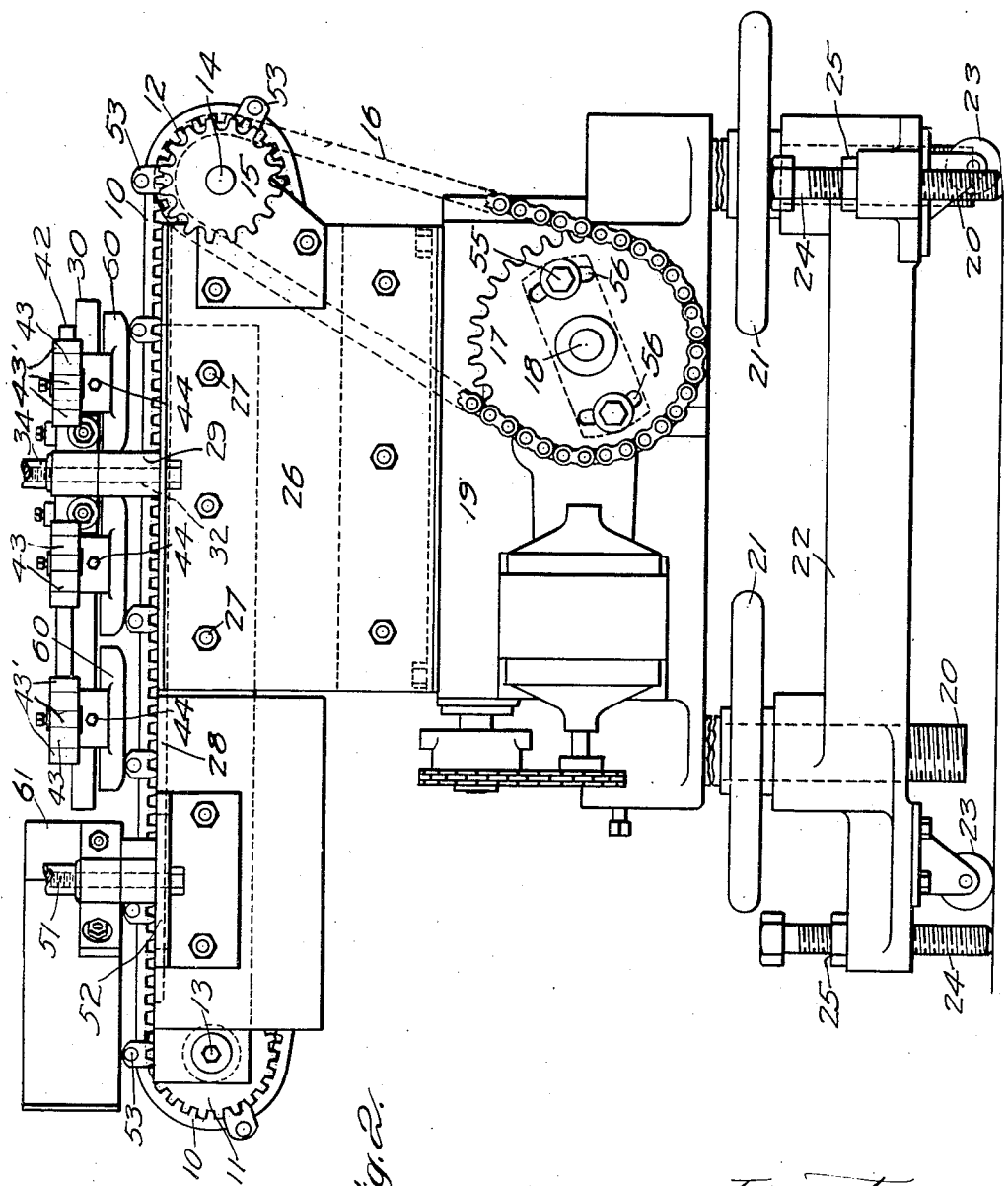
Fig. 2 is a side elevation of the device shown in Fig. 1.
Figure 3:
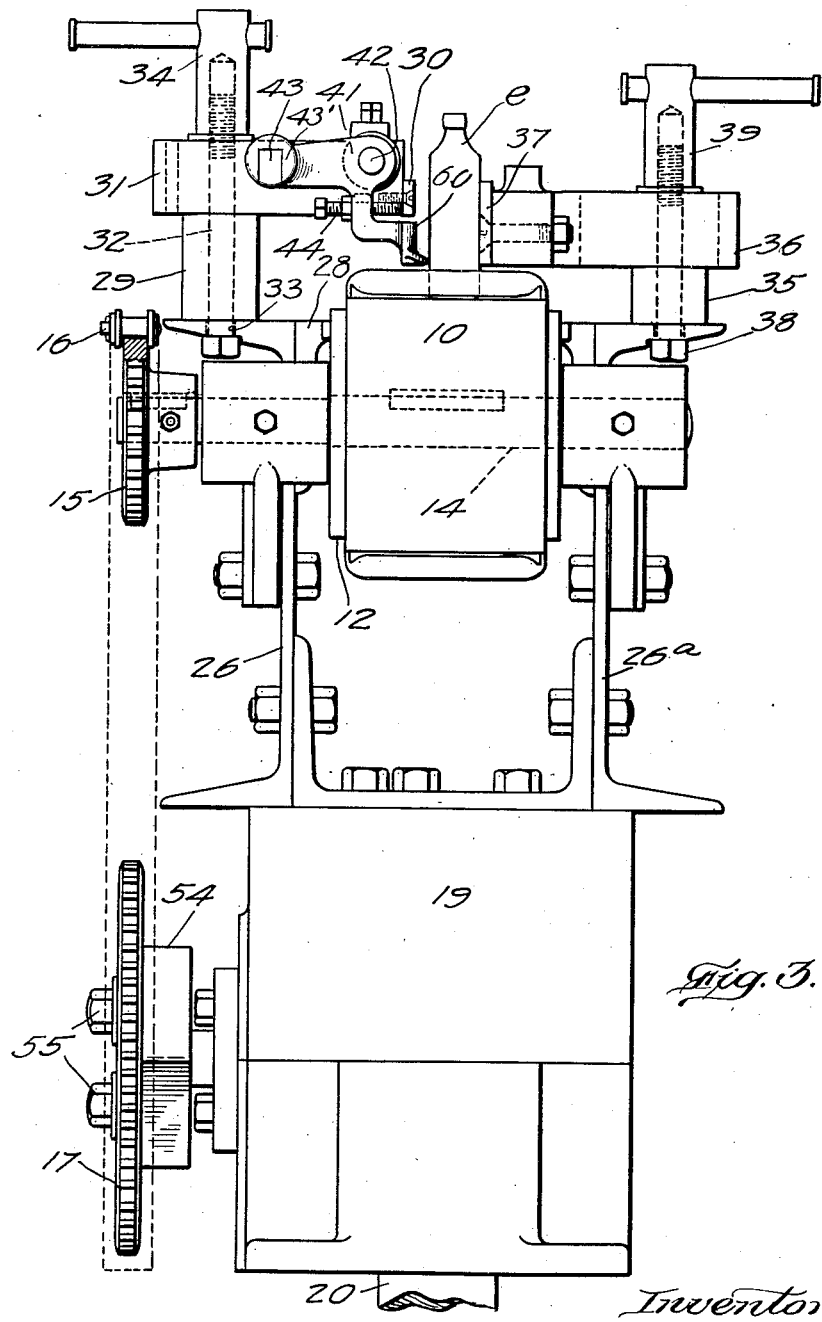
Fig. 3 is an end elevation of the device shown in Figs. 1 and 2.

From the above description it will be apparent that the invention provides simple and efficient transporting apparatus operating automatically to line up articles of irregular shape, so that the stacker may pick up each article from the same delivery position and that each article, regardless of its width, may be accurately positioned with respect to the stacker when it comes to rest at delivery position between the third or last presser shoe 60 and the guide rail 37 at the right hand end of the machine, as shown in Figs. 1 and 2 (position *e*).

Imperfect articles are sometimes produced by forming machines which are either greater or less in width than normal articles in which case such imperfect articles will be lined up with the rest without causing a stoppage of the transporting apparatus as would be the case if the bottles were passing between fixed and unyielding guideways, the variation between the position of the neck or finish which is gripped by the stacker and the side which is aligned by the guide rail 37 usually being insufficient to prevent the finish being engaged by the usual stacker tongs if the side is properly aligned.

While I have shown and described but one embodiment of my invention, it is obvious that many modifications might be made therein and many of the individual features might be used in other combinations without departing from the spirit of the invention as set forth in the appended claims, which are to be construed as broadly as the state of the prior art permits.

What I claim is:

1. A buck for conveying and spotting articles of glassware comprising an endless belt, a plurality of transversely extending cleats fixed to said belt at evenly spaced intervals, means for moving said belt, a longitudinally extending guide rail secured at one side of the path of travel of articles on said belt, and an opposed yieldingly mounted presser shoe adapted to engage said articles to position them laterally against said guide rail, said shoe and said rail frictionally retarding the movement of said articles until they abut against one of said cleats and are positively moved thereby, whereby accurately to spot said articles.

2. A buck for conveying and spotting articles of glassware comprising an endless belt, a plurality of transversely extending cleats fixed to said belt at evenly spaced intervals, step-by-step moving means for said belt adapted to move it the distance between two cleats at each step, means for adjusting the position occupied by said belt at the end of a step in its movement with respect to said moving means, a longitudinally extending guide rail secured at one side of the path of travel of articles on said belt, and a yieldingly mounted presser shoe adapted to engage said articles to position them laterally against said guide rail, said shoe and said rail frictionally retarding the movement of said articles until they abut against one of said cleats and are positively moved thereby, whereby accurately to spot said articles.

3. A buck for conveying and spotting articles of glassware comprising an endless belt, a plurality of transversely extending cleats fixed to said belt at evenly spaced intervals, step-by-step moving means for said belt adapted to move it the distance between two cleats at each step, means for adjusting the position occupied by said belt at the end of a step in its movement with respect to said moving means, a longitudinally extending guide rail secured at one side of the path of travel of articles on said belt, means to adjust the position of said guide rail transversely of said belt, and a yieldingly mounted presser shoe adapted to engage said articles to position them laterally against said guide rail, said shoe and said rail frictionally retarding the movement of said articles until they abut against one of said cleats and are positively moved thereby, whereby accurately to spot articles of various sizes and shapes.

4. A buck for conveying and spotting articles of glassware comprising an endless belt, a plurality of transversely extending cleats fixed to said belt at evenly spaced intervals, step-by-step moving means for said belt adapted to move it the distance between two cleats at each step, means for adjusting the position occupied by said belt at the end of a step in its movement with respect to said moving means, a longitudinally extending guide rail secured at one side of the path of travel of articles on said belt, means to adjust the position of said guide rail transversely of said belt, a plurality of weighted presser shoes mounted opposite said guide rail and adapted to urge the articles being conveyed into engagement therewith, and means to adjust the positions of said shoes transversely of said belt, said shoes and said rail cooperating frictionally to retard the movement of said articles until they abut against one of said cleats and are positively moved thereby, whereby accurately to spot articles of various sizes and shapes.

5. A buck for conveying and spotting articles of glassware comprising an endless belt, means for moving said belt, a longitudinally extending guide rail on each side of the path of travel of articles on said belt, a weighted presser shoe pivoted to one of said guide rails and adapted to bear against said articles to urge them into engagement with the other of said rails, independent means for adjusting the position of each of said rails transversely of said belt, said shoe extending beneath the rail to which it is pivoted and toward the other of said rails, whereby bottles of varying widths may be accommodated without changing the position of said rails, and adjustable means for limiting the degree which the presser shoe may extend transversely beyond the rail to which it is pivoted without varying the amount of pressure exerted by the presser shoe.

Signed at Hartford, Conn., this 15th day of December, 1927.

GEORGE E. ROWE.